United States Patent
Zamat (12)

(10) Patent No.: US 6,321,068 B1
(45) Date of Patent: Nov. 20, 2001

(54) DETECTION OF TRANSMITTED POWER USING RECEIVED SIGNAL STRENGTH CIRCUITRY

(75) Inventor: Hassan Zamat, San Diego, CA (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

(21) Appl. No.: 09/224,375

(22) Filed: Dec. 31, 1998

(51) Int. Cl.[7] ...................................................... H04Q 7/00
(52) U.S. Cl. ............................................. 455/69; 455/522
(58) Field of Search ................................ 455/68, 69, 70, 455/522, 126, 115, 127, 226.1, 226.2, 67.1

(56) References Cited

U.S. PATENT DOCUMENTS 5,937,336 * 10/1999 Kumagai ................................ 455/69
6,002,942 * 12/1999 Park ......................................... 455/69

* cited by examiner

Primary Examiner—Thanh Cong Le
(74) Attorney, Agent, or Firm—Heller Ehrman White & McAuliffe

(57) ABSTRACT

A communications device determines transmitted signal power by providing the transmitted signal to a signal strength indication (SSI) processor that detects voltage of the transmitted signal and determines signal power of the transmitted signal during normal operation by searching a calibration table of the SSI processor and correlating the detected transmitted signal voltage to stored signal power values. The calibration table is constructed by providing transmitted signals to the SSI processor during a calibration phase of operation, detecting the transmitted signal power, and storing the transmitted signal voltage level with the detected transmitted signal power, for a plurality of transmitted signals. Thus, the SSI processor combines the function of a conventional RSSI processor and also performs measurement of the transmitted signal power.

13 Claims, 4 Drawing Sheets

| RSSI | POWER | TSSI | POWER |
|------|-------|------|-------|
| 1V | -50 dBM | 1V | 1W |
| .2V | -80 dBM | .2V | 1 mW |
| .3V | -100 dBM | .3V | 0.3 mW |
| ⋮ | ⋮ | ⋮ | ⋮ |
| ⋮ | ⋮ | ⋮ | ⋮ |

DETECTION OF TRANSMITTED POWER USING RECEIVED SIGNAL STRENGTH CIRCUITRY

BACKGROUND OF THE INVENTION

1. Field of the Invention

This invention relates generally to communication devices and, more particularly, to processing of received signals in mobile communication devices.

2. Description of the Related Art

Mobile communication systems typically include mobile communication devices, such as cellular telephones, that transmit and receive telecommunication signals to and from fixed base stations. The fixed base stations may have interfaces to the public switched telephone network (PSTN), also referred to as land lines. The transmission and reception of signals typically occurs in the radio frequency (RF) bands of the telecommunications spectrum at assigned frequencies. The signal power of such transmissions is relatively low, often measured in milliwatts (mW) or decibel milliwatts (dBm).

A base station typically transmits a pilot signal over a control channel. The mobile communication devices monitor the control channel when not actively engaged in a telephone call and provide identification information over the control channel. This permits the base stations to know the identity of communication devices for which they have responsibility. When a call arrives at the base station from the PSTN, the base station sends a control signal for the appropriate mobile device, which then receives the control signal and moves to an assigned call channel to receive the telephone call. Thus, the mobile communications device is continuously receiving either the control pilot signal or an active telephone call signal. Typically, all telephone call signals received at a mobile communication device are assigned to one frequency band, and all telephone call signals transmitted from a mobile communication device are assigned to a different frequency band, higher than the receiving band.

When a cellular base station detects that the signal from a mobile device is too weak, the base station queries a neighboring base station to determine the signal strength from the same mobile device. If the signal being received by the neighboring base station is stronger, then the first base station hands off the telephone call to the second base station, which takes over communication responsibilities for the telephone call. Thus, base stations continuously check the power of signals received from the mobile devices, using subsystems referred to as received signal strength indication (RSSI) systems.

The mobile communication devices also require RSSI systems because the mobile communication devices must also report to the base stations on the strength of the signals they receive from the base stations. The base stations will request RSSI data from the mobile devices and will use that information for making hand-off decisions, power modulation commands, and the like. Yet another application of RSSI systems is to determine which base station or channel to use. The mobile device will measure the signal strength over several channels and use the strongest received signal for processing.

The mobile device RSSI systems are usually calibrated during a preproduction calibration phase of operation, in which signals of known power are transmitted to the mobile device, and the voltage of the received signal is measured in the device and correlated to the known signal transmission power. In a mobile device with digital operation, the voltages of the received signals are stored in an RSSI table that pairs the received voltages with the known signal strength values. A central processing unit (CPU) of the mobile device can thereafter determine the received signal voltage and, if necessary, interpolate between two received signal power entries of the RSSI table to find a signal power value that corresponds to the received signal voltage.

In addition to measuring received signal strength, the mobile devices are required to modulate their respective transmitted signal power in response to the base stations, and therefore must monitor the strength of their own output signals. For example, if two mobile devices are being handled by the same base station, and one is much closer to the base station than the other, the closer mobile device will have a much greater received signal power at the base station if both mobile devices transmit at the same power. In that situation, the signal from the closer mobile device can overwhelm the signal from the farther mobile device, even if they are assigned to different frequencies, and this will disrupt communication.

To prevent disruption of calls, a base station that is handling multiple mobile devices will request a closer mobile device with a stronger received signal to reduce the power of its transmitted signal. In most telephone systems, the amount of power reduction will occur in predetermined, incremental steps, through different power levels. For example, power levels may occur in steps of 4 dB. Those skilled in the art will recognize "dB" as a relative power indication that equates to power rations, where typically xdB (signal power)=10 log (ratio), so that 3 dB represents twice the power, where 3dB=10 log 2, and 10 dB is ten times the power (10 dB=10 log 10) (it should be noted that for relative signal voltage, the relationship is xdB (voltage)=20 log (ratio)). For telephone mobile systems, most power units are in milliwatts, written as "dBm" units, where 0 dBm is 1 milliwatt. Thus, 10 dBm is a power level 10 dB above 1 milliwatt, because 10 dB is a ratio of ten times the power. Thus, 10 dBm indicates ten times above 1 milliwatt, which is equal to 10 mW, and 20 dBm is 100 mW, 30 dBm is 1000 mW (1 watt), and so forth. Thus, it is necessary for the mobile communications devices to control and monitor their respective signal power outputs, and therefore they must have systems that detect their respective transmitted signal power, in addition to their RSSI systems.

Conventionally, power detection of transmitted signals involves systems that include a power measuring circuit having a detector diode and voltage capacitor that takes a sample of the transmitted signal, thereby extracting a portion of the signal power, and then scales up the detected voltage to derive a signal power value. For example, the conventional mobile device power measuring circuitry may tap the output signal and inherently reduce the signal strength Furthermore, the dynamic range of the detector circuitry is limited. Such diode detection systems can be problematic, because they often have multiple diodes, each with different temperature sensitivities and non-linear modes of operation. In addition, the detected voltage (and power) varies over frequency as well. Inaccuracy in transmitted power measurement is the usual result.

Each additional circuit that is required for a mobile communication device adds to the production cost of the device. Additional circuitry also adds to the weight and physical size of the device, which is undesirable in a mobile communication device. Finally, each additional circuit is potentially an added power drain on the on-board (battery) power available, decreasing battery life and duration of charge.

From the discussion above, it should be apparent that there is a need for a mobile communication device that can monitor transmitted signal power and received signal power with a minimum of cost, size, and energy use. The present invention fulfills this need.

SUMMARY OF THE INVENTION

The present invention provides a communications device that determines transmitted signal power by providing the transmitted signal to a signal strength indication (SSI) processor that detects voltage of both the received signal and the transmitted signal, and determines signal power of the received and transmitted signals during normal operation by searching a calibration table of the SSI processor and correlating detected signal voltage to stored signal voltage-power values. The calibration table entries for the received signal may be determined with conventional received signal strength indication (RSSI) methodologies or other suitable methods. The calibration table entries for the transmitted signal are determined by providing transmitted signals to the SSI processor during a calibration phase of operation, detecting the transmitted voltage and corresponding signal power, and storing the transmitted signal voltage level with the detected transmitted signal power, for a plurality of transmitted signals. Thereafter, during normal operation, the SSI processor accurately determines the transmitted signal strength by processing the transmitted signal. In this way, the SSI processor handles both received signals and transmitted signals, so that there is no duplication of signal strength circuitry. This reduces the production cost, physical size, and energy consumption of the mobile communication device.

In one aspect of the invention, the SSI processor makes use of an RSSI table that stores received signal voltage-signal power data pairs that are established during the calibration phase of operation. The RSSI table enables the SSI processor to determine received signal power during normal operation. In another aspect of the invention, the SSI processor makes use of a TSSI table that stores transmitted signal voltage-signal power data pairs that are established during the calibration phase of operation. The TSSI table enables the SSI processor to determine transmitted signal power during normal operation.

Other features and advantages of the present invention should be apparent from the following description of the preferred embodiments, which illustrate, by way of example, the principles of the invention.

DESCRIPTION OF THE PREFERRED EMBODIMENTS

Figure 1:
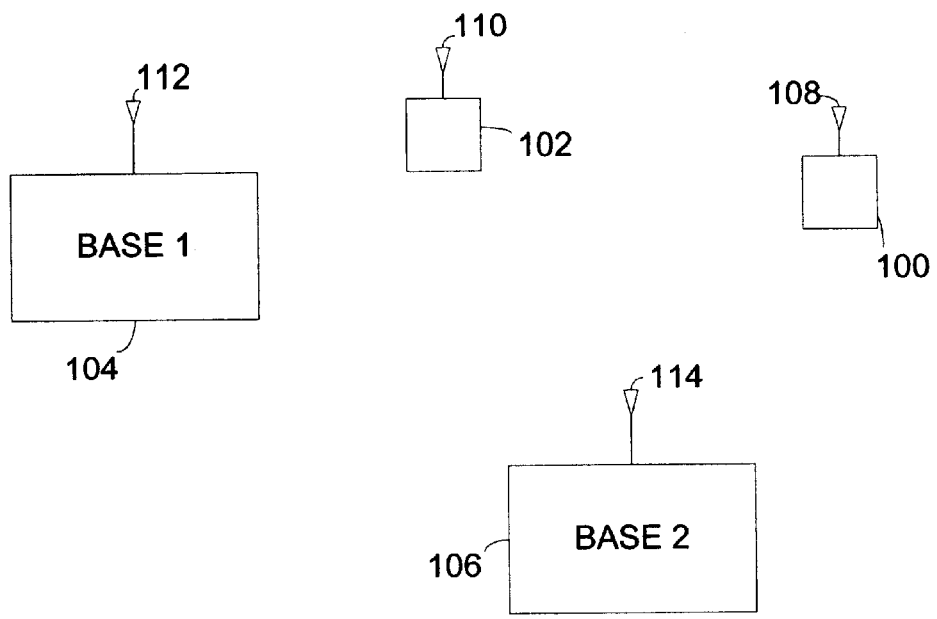
FIG. 1 is a schematic diagram that illustrates the transmission and reception of signals performed by a mobile communication device constructed in accordance with the present invention.

FIG. 1 illustrates a mobile communications device 100 constructed in accordance with the present invention for the transmission and reception of communication signals. The first mobile device 100 moves about relative to a second mobile communication device 102 and to a first fixed base station 104 and a second fixed base station 106. Each communication device and base station includes a respective antenna 108, 110, 112, 114 to communicate with each other via transmitted and received signals. In accordance with the invention, the mobile device 100 determines both received and transmitted signal power by providing the signals to an internal signal strength indication (SSI) processor that detects voltage of a signal and determines signal power during normal operation by searching a calibration table and correlating the detected signal voltage to corresponding stored signal power values. The calibration table entries for the received signal may be determined in a conventional manner during a calibration phase of operation in which received signal voltage-power data is stored in an RSSI table. The calibration table entries for the transmitted signal are determined by providing transmitted signals to the SSI processor during the calibration phase of operation, detecting the transmitted signal power with an external device, and storing the transmitted signal voltage level with the detected transmitted signal power, for a plurality of transmitted signals. Thereafter, during normal operation, the SSI processor accurately determines the transmitted signal strength by processing the transmitted signal.

The SSI processor advantageously implements typical RSSI processing, but unlike conventional mobile communication devices, the SSI processor determines signal strength of both received and transmitted signals. In this way, there is no unnecessary duplication of signal strength circuitry between the receive channels and the transmit channels, which reduces the production cost, physical size, and energy consumption of the mobile communication device 100. Moreover, the device 100 performs with increased detection accuracy. The mobile communication device 100 performs conventional base station hand-off, signal processing, and power transmission modulation functions associated with mobile communications systems, such as cellular telephone systems, making use of the RSSI and TSSI table of the SSI processor.

Figure 2:
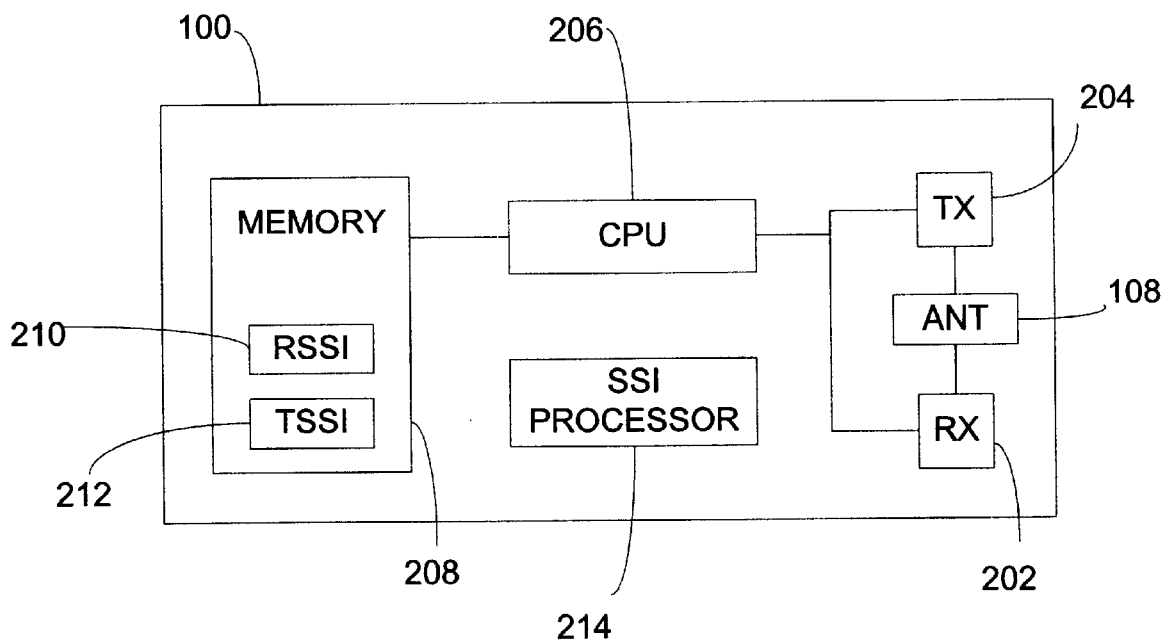
FIG. 2 is a block diagram of the mobile communication device illustrated in FIG. 1.

FIG. 2 is a block diagram of the mobile communication device 100 and shows that it includes receive channel (RX) circuitry 202 and transmit channel (TX) circuitry 204 that communicate with the device antenna 108. The device 100 operates under control of a central processor unit (CPU) 206 that determines the operations carried out by the device. Programming instructions executed by the CPU to implement the operations are stored in device memory 208 that also contains the RSSI table 210 and TSSI table 212 signal voltage-power entries. The SSI processor 214 of the mobile communications device implements processing typically performed by RSSI circuitry to determine received signal strength, but additionally in the novel device 100 also determines transmitted signal strength. Accordingly, in the novel device, it is referred to as a signal strength indication (SSI) processor rather than an RSSI processor.

In the preferred embodiment, the SSI processor 214 comprises programming instructions that are executed under control of the CPU 206. The programming instructions to implement the SSI processor are stored in the memory, but the SSI processor is illustrated in FIG. 2 as a separate block for purposes of discussion. It also should be understood that the SSI processor is illustrated as a block because it could be implemented as separate hard-wired circuitry, rather than in the digital processor implementation of the preferred embodiment.

It also should be understood that the mobile device 100 in accordance with the invention is especially suited to communication systems in which the receive chain 202 can be utilized during message transmission, because the present invention implements measurement of transmitted signal strength by using the signal strength processing mechanisms that are typically used repeatedly by the receive channel. That is, the CPU 206 must take over use of the receive chain during transmission times. Thus, the device 100 is suited to so-called Frequency Division Duplex (FDD) systems that transmit and receive on different frequencies, such as time division multiple access (TDMA) or the cellular Advanced Mobile Phone Service (AMPS) systems, but is not practical for systems that transmit and receive over single assigned channels.

Figures 3, 4:
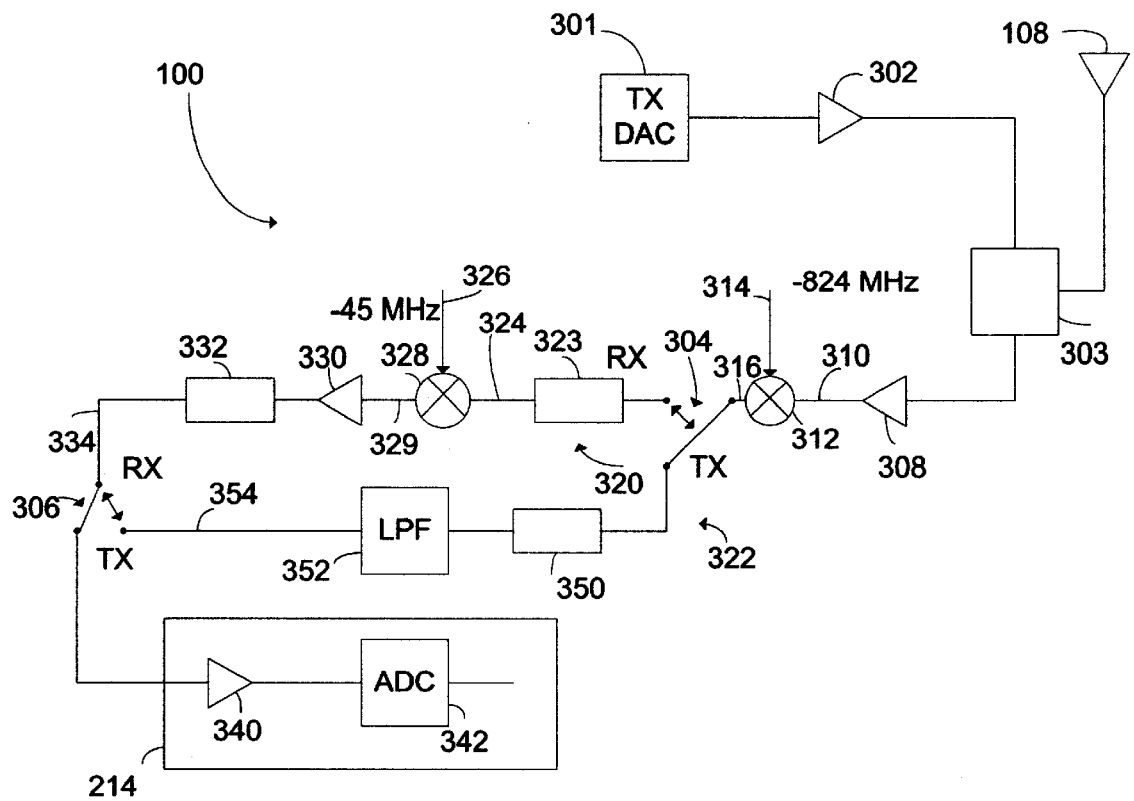
FIG. 3 is a block diagram of the signal processing components in the mobile communication device illustrated in FIG. 1.
FIG. 4 is a representation of the received signal strength indication (RSSI) table and the transmitted signal strength indication (TSSI) table stored in memory of the device illustrated in FIG. 2.

FIG. 3 is a block diagram of the signal processing components in the mobile communication device 100 illustrated in FIG. 1 for determining signal strength. When a signal is being received, it is detected from the antenna 100 and passed on to receiving circuitry for processing by the SSI processor 214. When a signal is being transmitted, the signal is emitted from the antenna 108. When the transmitted signal is generated from a digital-to-analog converter 301 of the transmit channel, the signal is amplified by a power amplifier 302 and then is provided to the antenna 108, and also to the signal strength processing circuitry 214, when needed. Details of the signal generation and transmission capability are conventional and are not illustrated for simplicity.

Those skilled in the art will appreciate that the signal power at the antenna 108 of a transmitted signal is much greater than the signal power of a received signal. Therefore, connected to the device antenna 108 is a filter 303 that reduces the transmitted signal by 50 dB to 80 dB to be more nearly equal to that of a received signal. First and second switches 304, 306 described further below will be activated by the device CPU depending on whether the signal strength of a transmitted signal or received signal is being measured. An amplifier 308 represents a circuit block to amplify and increase the signal strength of the received signal, and for other processing, producing a processed signal 310.

If the communication system of the device 100 is a conventional cellular system such as implemented in North America, then the signal whose strength is being determined during transmission will have a frequency in the range of 824 MHz to 849 MHz. The signal whose strength is being determined during reception will have a frequency in the range of 869 MHz to 894 MHz. Therefore, a mixer 312 receives an 869 MHz signal 314 and subtracts it from the processed signal 310 to produce a signal 316 that, if a received signal, will have a frequency of 45 MHz, and if a transmitted signal, will have a frequency of 0 MHz, that is, a dc voltage that will be processed to determine the transmitted signal strength.

The first signal switch 304 moves the signal processing operation between a received signal (RX) processing chain 320 and a transmitted signal (TX) processing chain 322. In the received chain 320, the processing is that which will be well-known to those skilled in the art for conventional received signal strength indication (RSSI) systems. That is, a filter 323 receives the signal 316 and processes it to provide a filtered signal 324. A 45 MHz signal 326 is received by a mixer 328 to reduce the 45 MHz signal to a baseband signal 329 comprising a voice signal having a frequency range generally from 0 kHz to 3 kHz. Further signal processing may occur in another amplifier 330 and filter 332 to produce a processed signal 334 that is ready for the SSI processor 214. The second signal switch 306 toggles between receive (RX) processing and transmit (TX) processing so as to provide the signal 334 to the SSI processor 214 during RSSI processing. In the SSI processor, further amplification 340 may occur before an analog-to-digital converter (ADC) 342 converts the signal to digital data, where processing such as data interpolation can occur to determine the received signal strength, as described further below.

If the strength of a transmitted signal is being determined, then the device CPU 206 causes the first switch 304 to send the transmitted signal to the transmitted signal TX processing chain 322. In the transmitted signal chain, the signal 312 will have a frequency of zero MHz (or dc voltage). A pad circuit 350 in the transmit processing chain 322 adjusts the signal voltage and provides the signal to a low pass filter (LPF) 352, which produces a filtered signal 354 having a reduced frequency range that can be handled by the SSI processor 214. During the transmitted signal processing, the second signal switch 306 will be operated by the device CPU 206 to direct the signal 354 to the SSI processor 214.

In the SSI processor 214, the signal being processed is converted to a digital representation by the ADC 342. The SSI processor can then consult a calibration table, either the RSSI table 210 or the TSSI table 212 (FIG. 2). The contents of the calibration tables are illustrated in FIG. 4, which illustrates an exemplary calibration table 402 comprising an RSSI table 404 and a TSSI table 406. FIG. 4 shows that the respective table entries are organized according to the signal value output from the ADC in an RSSI column 410 or TSSI column 412, and the corresponding signal power in a signal power column 414, 416 respectively. As noted above, it is not uncommon for mobile communication devices to include a processor that uses the RSSI data, such as contained in the RSSI table 404, to determine signal strength of a received signal. The present invention effectively appends the RSSI table with TSSI data that is used by the same processor during signal strength determination of the transmitted signal.

Figure 5:
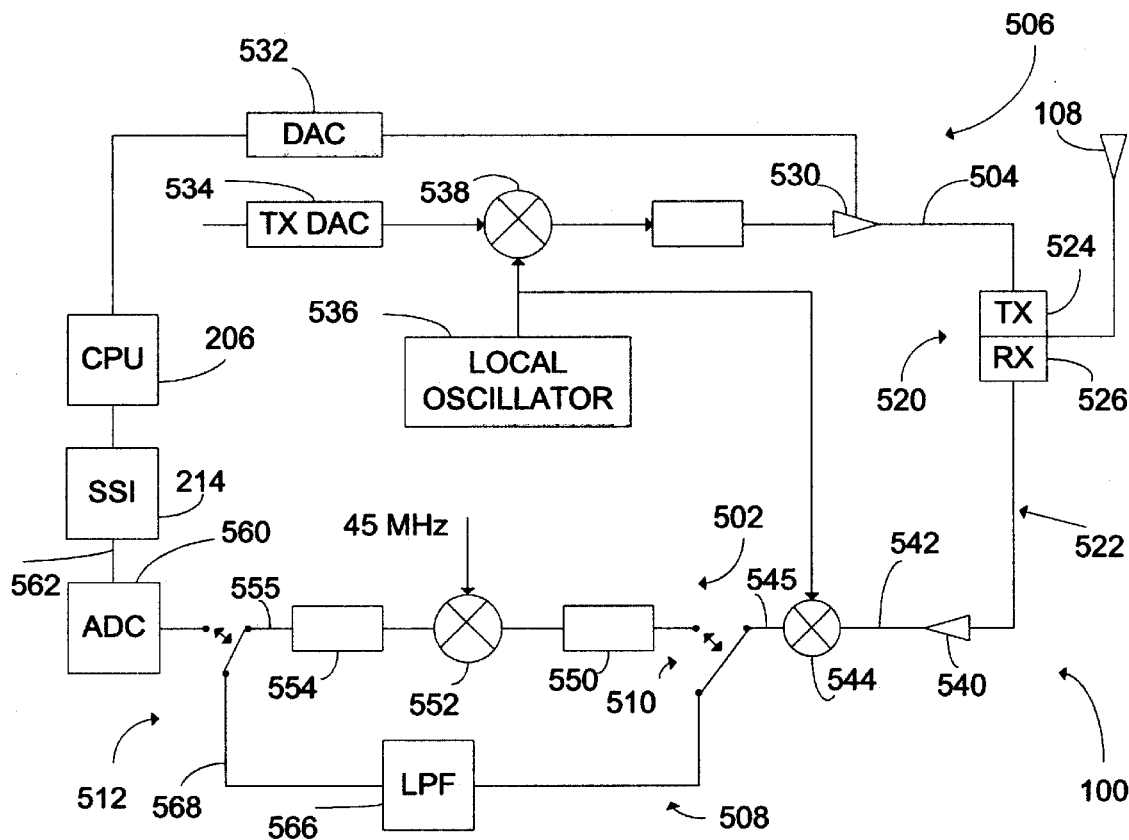
FIG. 5 is a block diagram of an alternate embodiment of the signal processing components for the device illustrated in FIG. 1.

FIG. 5 is a block diagram of the signal processing components in an alternative embodiment of the mobile communication device 100 illustrated in FIG. 1. When a signal is being received, it is detected at the antenna 108 and passed to a received SSI channel 502 for processing by the SSI processor 214, where received signal strength is determined. When a signal is to be transmitted, a signal 504 is generated in a signal generator 506 and then is provided to the antenna 108, from where it is emitted, and the signal also is passed to a transmitted SSI channel 508 for processing by the SSI processor 214, where transmitted signal strength is determined. In a system such as AMPS, the received signal and transmitted signal are tied together, meaning that the received signal is always 45 MHz higher than the transmitted signal.

In the FIG. 5 system, first and second switches 510, 512 control the signal path to send the signal being measured to either the received SSI channel 502 path or the transmitted SSI channel 508 path. For signal transmission, the transmitted signal 504 follows a signal path that begins with the conventional signal generation circuitry 506, which is operated under control of the device CPU 206, and concludes with emission from the antenna 108. When it is necessary to determine the transmitted signal power, the first and second switches 510, 512 are set such that the signal 504 also is routed through the transmitted SSI channel 508 to the SSI processor 214. When it is necessary to determine the received signal power, the first and second switches 510, 512 are set such that the signal received from the antenna 108 is routed through the received SSI channel 502.

When the device 100 is being operated in the transmit mode of operation, the nominal transmit frequency of the generated signal 504 is in the range of approximately 824 MHz to 849 MHz, while the received signal range is from 869 MHz to 894 MHz. A duplexor 520 provides an interface between the antenna 108 and the signal transmission circuitry 506 and signal reception circuitry 522 to provide proper signal levels. Thus, the duplexor 520 includes a transmitted (TX) signal filter 524 and a received (RX) signal filter 526.

In the transmit mode, the nominal signal strength of the transmitted signal 504 can vary from 0 dBm (1 mW) to 30 dBm (1000 mW) greater than that of the received signal. When the transmitted signal strength is to be determined, the RX signal filter 526 of the duplexor 520 attenuates the transmitted signal by approximately 80 dB. This ensures that the transmitted signal level at the output of the duplexor 520 is down about −80 dBm to −50 dBm from its transmission strength at the antenna 108. This is well within the nominal received signal range of −115 dBm to −20 dBm.

For signal transmission, after the signal generation circuitry 506, the transmit signal 504 is provided to a power amplifier 530. The device 100 can advantageously use the SSI processor 214 to control transmitted signal power level during signal generation. For example, once the transmitted signal power level is detected, the device CPU 206 will calculate the transmit signal power needed for proper transmission of signals, and will transmit the proper level to a power setting DAC 532 of the signal generation circuitry 506. It should be understood that the signal 504 being transmitted is provided to the power amplifier 530 after being generated by a transmit digital-to-analog converter (TX DAC) 534 that combines a carrier frequency from a local oscillator 536 in a mixer 538.

Whenever the signal strength of a signal is to be determined, whether transmitted or received, the signal is sent from the RX signal filter 526 side of the duplexor 520 to an amplifier 540 to produce an amplified signal 542. The amplified signal is provided to a mixer 544 that removes the carrier frequency provided by the local oscillator 536 to produce a processed signal 545, which is then provided to the first switch 510. The device CPU 206 operates the first and second switches 510, 512 so as to send the signal being processed through the received SSI channel 502 when processing a received signal, and to send the signal being processed through the transmit SSI channel 508 when processing a transmitted signal.

Thus, when processing a received signal, the first switch 510 is operated to send the processed signal 545 to a first filter 550 and then to a mixer 552, which receives a 45 MHz signal with which the mixer removes the 45 MHz frequency differential between transmitted and received signals. After the mixer 552, the resulting signal may be filtered again at a filter 554, and then the filtered signal 555 will be provided to the second switch 512, which is operated by the device CPU 206 in concert with the first switch 510. Thus, the second switch 512 will send the filtered signal to an analog-to-digital converter (ADC) 560 of the receiving channel 522 and then the converted signal 562 will be sent to the SSI processor 214.

If a transmitted signal is being processed, then the switches 510 and 512 are operated so the processed signal 545 is sent to a low pass filter (LPF) 566 and then the filtered signal 568 is provided to the second switch 512, which then sends the signal to the ADC 560 and then the SSI processor 214. As noted above with the description of FIG. 4, the SSI processor uses calibration tables and determines both received signal strength and transmitted signal strength.

Figure 6:
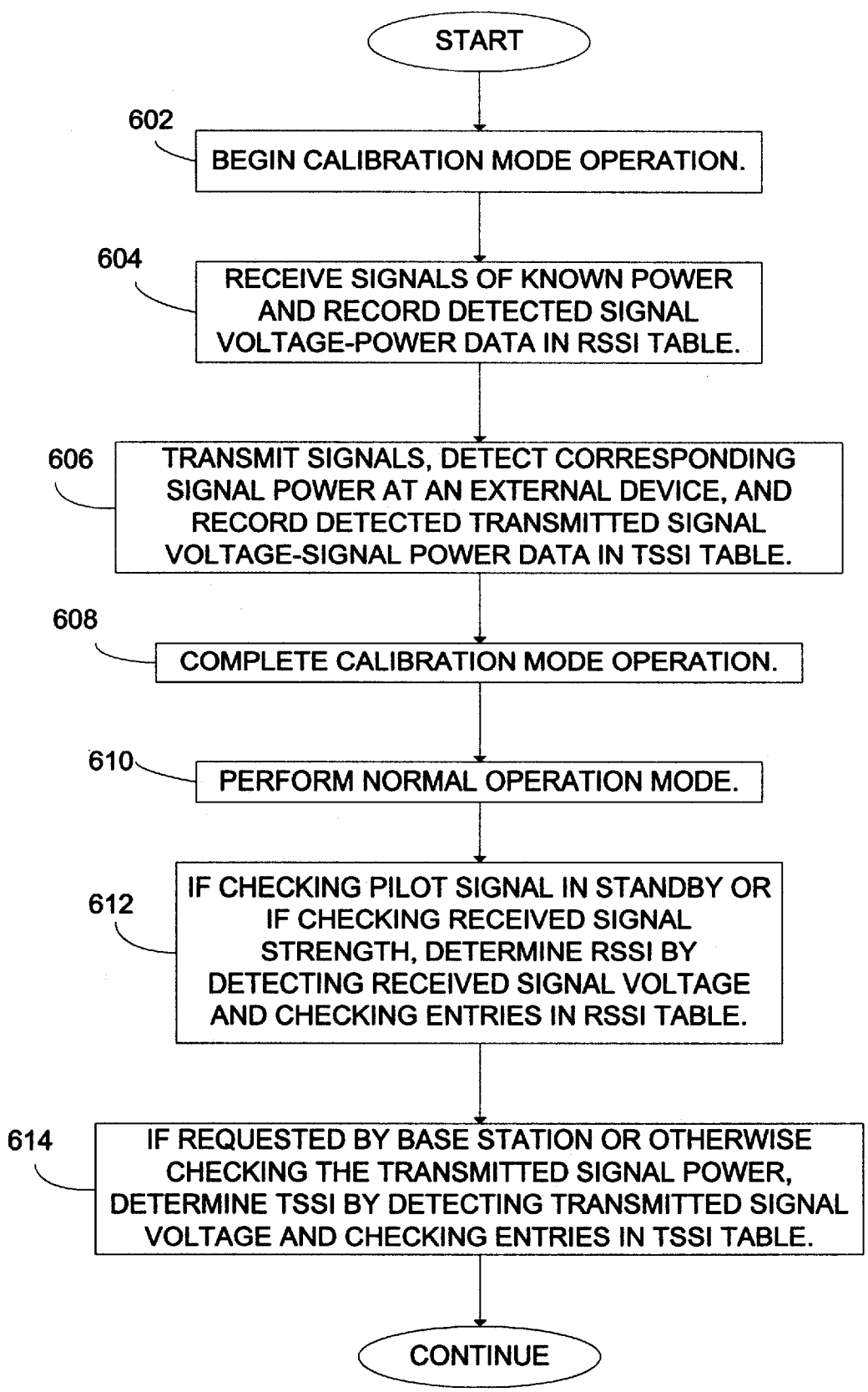
FIG. 6 is a flow diagram of the processing steps performed by the mobile communication device illustrated in FIG. 2.

The operation of the mobile communication device 100, including construction of the respective calibration tables, is illustrated by the flow diagram of FIG. 6. Operation of the novel signal strength circuitry of the present invention involves operation during a calibration mode of the communication device and subsequent normal operation. Thus, processing in accordance with the present invention begins with the preproduction calibration processing, indicated in FIG. 6 by the flow diagram box numbered 602. This processing occurs before delivery of the communication device to an end user and may include storing of various data into the device, including operating parameters that are dependent on the particular device. Such parameters may include, for example, temperature dependent data, telephone number data, identification codes and serial numbers, and the like.

In the next calibration operation, represented by the flow diagram box numbered 604, the communication device receives multiple signals of known power and records the detected received signal voltage and signal power data pairs in the RSSI table that will be used by the SSI processor. The respective signal power can be determined, for example, by calibrated test equipment or equivalent receiver with accurate power measuring circuitry at the communication device. In this way, the power of the received signal at the communication device can be determined with a relatively high degree of confidence in its accuracy. The detected signal voltage-power pairs of data are stored in the RSSI table at each of the multiple predetermined power levels.

After the RSSI table is completed, the transmitted signal voltage-power data must be stored in the TSSI table, an operation represented by the flow diagram numbered 606. In this step, multiple signals are transmitted from the communication device being calibrated and are received at a calibrated power meter or equivalent receiving device at a fixed distance, but preferably substantially adjacent to the communication device being calibrated. The transmitted signal is simultaneously provided to the receive channel processing circuitry of the device, as described above, for signal power determination. Thus, the detected voltage of the transmitted signal is stored, along with the determined signal power data, for each of the transmitted signals. These transmitted signal voltage-power data pairs comprise the TSSI table entries. It should be understood that the entries shown in the calibration table 402 are for purposes of illustration only and should not be taken as definitive of actual table entries in the communication device.

After the entries in the calibration table 402 are completed, any further calibration mode processing is completed, as indicated by the flow diagram box numbered 608. After completion of the calibration mode of operation, the device operates under normal modes of operation, as indicated by the flow diagram box numbered 610. As part of the normal operation, the communication device of the preferred embodiment monitors a pilot signal of a base station in a standby operation and periodically checks the received signal strength in accordance with the invention, as indicated by the flow diagram box numbered 612. That is, the RSSI is periodically determined by detecting the received signal voltage and by checking the RSSI table. Other received signal power measurements may be taken, such as in response to a query by a base station.

When performing such received-signal power measurement, the SSI processor of the illustrated communication device checks the received signal voltage against the signal power entries of the RSSI table. If necessary, the SSI processor will perform interpolation to accurately determine received signal strength. The interpolation may comprise a linear interpolation scheme, wherein the SSI processor searches the calibration table and locates a signal voltage value that is greater than the detected voltage of the signal being measured, reverses the search and locates a signal voltage value that is less than the detected voltage of the signal, and then calculates a signal power value between the signal power values corresponding to the located signal voltage values that are greater than and less than the detected voltage, in proportion to the difference between the signal voltage values greater than and less than the signal voltage being measured. For example, if the received signal has a detected voltage of 0.6 V, then from checking the RSSI table of FIG. 4, the received signal strength of 0.6 V will correlate to a signal power of −65 dBm. This is part of the box 612 processing.

The communication device also may periodically need to determine transmitted signal strength. This operations is indicated by the flow diagram box numbered 614. When performing transmitted-signal power measurement, the SSI processor of the device sends the transmitted signal voltage to the receive signal processing chain and checks the transmitted signal voltage against the signal power entries of the TSSI table. As with the RSSI calculation, the SSI processor will, if necessary, perform interpolation to accurately determined transmitted signal strength, and the interpolation may comprise a linear interpolation scheme. Other interpolation schemes will occur to those skilled in the art, and may be used if desired. The communication device continues operation, checking RSSI and transmitted signal strength in this manner.

Other modifications to the disclosed embodiments may be used without departing from the teachings of the invention. For example, the duplexor 520 described in connection with FIG. 5 can be implemented as a switch, which can then eliminate the need for a separate transmit process path 508. An illustration of such an embodiment is shown in FIG. 7, which shows the duplexor implemented as a switch 701, which is operated by the device CPU 206 (FIG. 2).

Figure 7:
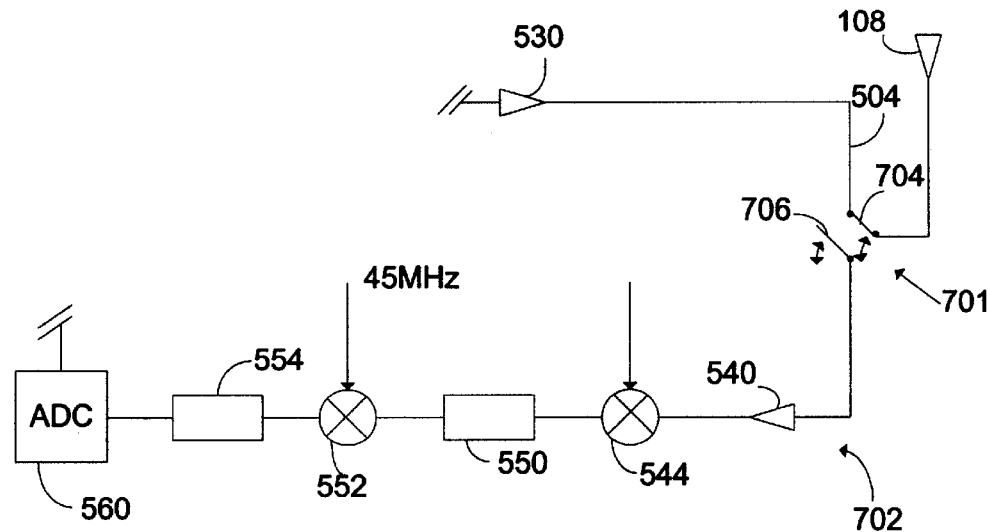
FIG. 7 is an alternative embodiment of the device illustrated in FIG. 5.

In FIG. 7, the signal path during processing of a received signal flows from the antenna 108 through the switch 701 and to receive signal processing circuitry 702. As with the other drawing figures, like reference numerals among the drawings refer to like elements. The signal path during processing of a transmitted signal is from the power amplifier 530 through the switch 701 and to the antenna 108 for emission, and also momentarily through the switch 701 during transmitted signal strength measurement.

The switch 701 operates with multiple elements that permit the device CPU 206 to select a variety of signal paths. Thus, in a signal receiving mode of operation, the switch 701 is operated so that the signal is received at the antenna 108 and then flows through the switch 701 to the signal processing circuitry 702. In a signal transmitting mode of operation, the switch 701 is operated so that the signal 504 flows from the amplifier 530 through the switch 701 to the antenna 108, where it is emitted. In a TSSI (transmitted signal strength indication) operating mode, the signal path of the transmitted signal 504 flows from the signal power amplifier 530 through the switch 701 and on to the receive signal processing circuitry 702. It should be apparent how the two indicated exemplary switch contact reeds 704, 706 must be operated to implement the signal paths just described.

In the FIG. 7 embodiment, signal transmission and reception do not occur at the same time, and the signal switching at the switch 701 obviates the need for receive signal processing that is separate from the transmit signal processing. Thus, the signal is processed without need for the separate low pass filter 566 and second switch 512 shown in FIG. 5. It should be understood that the control and signal generation elements shown in FIG. 5 have been eliminated from the FIG. 7 illustration for simplicity of illustration.

As described above, the present invention provides a communications device that determines transmitted signal power by providing the transmitted signal to a processor of the type that ordinarily performs received signal strength indication (RSSI) calculations. Thus, the processor detects voltage of both the received signal and the transmitted signal, and determines signal power of the received and transmitted signals during normal operation by searching a calibration table and correlating detected signal voltage to stored signal power values. The entries for the calibration table for the transmitted signal are determined by providing transmitted signals to the processor during a calibration phase of operation, detecting the transmitted signal power, and storing the transmitted signal voltage level with the detected transmitted signal power, for a plurality of transmitted signals. Thereafter, during normal operation, the SSI processor accurately determines the transmitted signal strength by processing the transmitted signal. This is similar to processing ordinarily undertaken for filling the entries in the RSSI table. In this way, the processor handles both received signals and transmitted signals, so that there is no duplication of signal strength circuitry. This reduces the production cost, physical size, and energy consumption of the mobile communication device.

The present invention has been described above in terms of a presently preferred embodiment so that an understanding of the present invention can be conveyed. There are, however, many configurations for mobile communication device signal strength processing systems not specifically described herein but with which the present invention is applicable. The present invention should therefore not be seen as limited to the particular embodiments described herein, but rather, it should be understood that the present invention has wide applicability with respect to mobile communication devices generally. All modifications, variations, or equivalent arrangements and implementations that are within the scope of the attached claims should therefore be considered within the scope of the invention.

I claim:

1. A method of determining transmitted signal power in a mobile communication device that transmits a signal to a base station and receives a signal from a base station, the method comprising:

providing the transmitted signal to a receiving channel of the mobile communication device,
      wherein the receiving channel includes a signal strength indication (SSI) processor that detects voltage of a provided signal for correlation of the detected voltage to stored signal power values of the provided signal, such that the SSI processor detects the voltage of the transmitted signal; and determining signal power of the transmitted signal from a calibration table of the SSI processor during a normal mode of operation of the mobile communication device by correlating the detected voltage of the transmitted signal to stored signal power values for the transmitted signal;

calibrating the detected signal voltage with the strength of a plurality of received signals having predetermined signal power;

wherein the step of calibrating comprises the steps of:

providing a received signal of predetermined signal power to the SSI processor, the received signal having a first signal power level;

detecting a signal voltage for the first signal power level; and repeating the steps of providing and detecting for a plurality of received signals having predetermined relative signal power.

2. A method of determining transmitted signal power in a mobile communication device that transmits a signal to a base station and receives a signal from a base station, the method comprising:

providing the transmitted signal to a receiving channel of the mobile communication device, wherein the receiving channel includes a signal strength indication (SSI) processor that detects voltage of a provided signal for correlation of the detected voltage to stored signal power values of the provided signal, such that the SSI processor detects the voltage of the transmitted signal; and determining signal power of the transmitted signal from a calibration table of the SSI processor during a normal mode of operation of the mobile communication device by correlating the detected voltage of the transmitted signal to stored signal power values for the transmitted signal;

wherein the step of determining signal power comprises the steps of:

searching the calibration table and locating a stored transmitted signal voltage value that is greater than the detected voltage of the transmitted signal;

searching the calibration table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

3. A method of determining transmitted signal power in a mobile communication device that transmits a signal to a base station and receives a signal from a base station, the method comprising:

constructing a received signal strength indication (RSSI) table of a receiving channel of the mobile communication device during a calibration phase of operation, wherein the RSSI table is constructed by performing the steps of receiving a plurality of input signals having known levels of signal power, determining an input signal voltage of each input signal, and storing the input signal voltage in the RSSI table and pairing it with the known level of signal power for the input signal voltage;

storing a plurality of transmitted signal voltage-signal power pairs in a transmitted signal strength indication (TSSI) table during the calibration phase of operation, wherein the transmitted signal voltage-signal pairs are stored by performing the steps of providing a transmitted signal to the receiving channel, determining the signal voltage of the transmitted signal in the receiving channel, determining the signal power of the transmitted signal, storing the transmitted signal voltage in the TSSI table and pairing it with the determined signal power for the transmitted signal; and determining the signal power of a transmitted signal during normal operation of the mobile communication device by providing the transmitted signal to the receiving channel of the mobile communication device, detecting the transmitted signal voltage, and correlating the detected signal voltage of the transmitted signal to the power of the transmitted signal from the stored transmitted signal voltage-signal power entries of the TSSI table.

4. A method as defined in claim 3, wherein the step of determining signal power comprises the steps of:

searching the TSSI table and locating a stored transmitted signal voltage value that is greater than the detected voltage of the transmitted signal;

searching the TSSI table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

5. A mobile communication device that transmits a signal to a base station and receives a signal from a base station, the mobile communication device comprising:

a central processing unit (CPU) that controls signal processing operations of the mobile communication device;

a signal strength indication (SSI) processor that detects voltage of a provided signal for correlation of the detected voltage to stored signal power values of the provided signal; and switching means for providing the transmitted signal of the communications device to the SSI processor, such that the SSI processor detects voltage of the transmitted signal and correlates the detected voltage of the transmitted signal to stored signal power values for the transmitted signal and determining signal power of the transmitted signal,wherein the CPU determines signal power by performing the steps of:

searching the calibration table and locating a stored transmitted signal voltage value that is greater than the detected voltage of the transmitted signal;

searching the calibration table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

6. A mobile communication device that transmits a signal to a base station and receives a signal from a base station, the mobile communication device comprising:

a signal strength indication (SSI) processor that detects voltage of a provided signal for correlation of the detected voltage to stored signal power values of the provided signal;

a received signal strength indication (RSSI) table of the mobile communication device that is constructed during a calibration phase of operation by performing the steps of receiving a plurality of input signals having known levels of signal power, determining an input signal voltage of each input signal, and storing the input signal voltage in the RSSI table and pairing it with the known level of signal power for the input signal voltage;

a transmitted signal strength indication (TSSI) table, wherein the TSSI table is constructed during the calibration phase of operation by performing the steps of providing a transmitted signal to the SSI processor, determining the signal voltage of the transmitted signal, determining the signal power of the transmitted signal, and storing the transmitted signal voltage in the TSSI table and pairing it with the determined signal power for the transmitted signal;

wherein the SSI processor periodically detects voltage of the transmitted signal and correlates the detected voltage of the transmitted signal to the stored signal power values for the transmitted signal of the TSSI table, and determines signal power of the transmitted signal from the stored transmitted signal voltage-signal power entries of the TSSI table.

7. A mobile communication device as defined in claim 6, wherein the SSI processor determines transmitted signal power by performing the steps of:

searching the TSSI table and locating a stored transmitted signal voltage value that is greater than the detected voltage of the transmitted signal;

searching the TSSI table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

8. A signal strength indication (SSI) processor for use in a mobile communication device that transmits a signal to a base station and receives a signal from a base station, the SSI processor comprising:

a received signal strength indication (RSSI) table that is stored in memory of the communication device and that is constructed during a calibration phase of operation by performing the steps of receiving a plurality of input signals having known levels of signal power, determining an input signal voltage of each input signal, and storing the input signal voltage in the RSSI table and pairing it with the known level of signal power for the input signal voltage; and a transmitted signal strength indication (TSSI) table that is stored in memory of the communication device, wherein the TSSI table is constructed during the calibration phase of operation by performing the steps of receiving a transmitted signal, determining the signal voltage of the transmitted signal, determining the signal power of the transmitted signal, storing the transmitted signal voltage in the TSSI table and pairing it with the determined signal power for the transmitted signal;

wherein the SSI processor periodically detects voltage of the transmitted signal and correlates the detected voltage of the transmitted signal to the stored signal power values for the transmitted signal of the TSSI table, and determines signal power of the transmitted signal from the stored transmitted signal voltage-signal power entries of the TSSI table.

9. A SSI processor as defined in claim 8, wherein the SSI processor determines transmitted signal power by performing the steps of:

searching the TSSI table and locating a stored transmitted signal voltage value that is greater than the detected voltage of the transmitted signal;

searching the TSSI table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

10. A method of determining transmitted signal power in a mobile communication device that transmits a signal to a base station and receives a signal from a base station, the method comprising:

during a calibration mode of operation of the mobile communication device, constructing a calibration table that has one or more entries, each entry comprised of a stored signal voltage paired with a stored signal power value that is determined to correspond to the stored signal voltage;

providing the transmitted signal to a receiving channel of the mobile communication device during a normal mode of operation of the mobile communication device, wherein the receiving channel includes a signal strength indication (SSI) processor that detects voltage of a provided signal for correlation of the detected voltage to stored signal power values of the provided signal, such that the SSI processor detects the voltage of the transmitted signal; and determining signal power of the transmitted signal from the calibration table of the SSI processor during the normal mode of operation of the mobile communication device by correlating the detected voltage of the transmitted signal to stored signal power values for the transmitted signal using the entries of the calibration table.

11. A method as defined in claim 10, additionally comprising:

providing a received signal of predetermined signal power to the SSI processor, the received signal having a first signal power level;

detecting a signal voltage for the first signal power level; and repeating providing the transmitted signal power and determining signal power for a plurality of received signals having predetermined relative signal power.

12. A method as defined in claim 10, wherein determining signal power comprises:

searching the calibration table and locating a stored transmitted signal voltage value that is greater than the detected voltage of the transmitted signal;

searching the calibration table and locating a stored transmitted signal voltage value that is less than the detected voltage of the transmitted signal; and interpolating a transmitted signal power value between the stored signal power values corresponding to the located signal voltage values that are greater than and less than the detected voltage of the transmitted signal.

13. A method as defined in claim 10, wherein determining signal power comprises:

sending a received signal to the SSI processor through a received signal processing path; and sending a transmitted signal to the SSI processor through a transmitted signal processing path.

* * * * *